United States Patent
Yu et al.

(10) Patent No.: US 11,575,199 B2
(45) Date of Patent: Feb. 7, 2023

(54) OPTICAL PHASED ARRAY ANTENNA AND LIDAR INCLUDING SAME

(71) Applicant: Gwangju Institute of Science and Technology, Gwangju (KR)

(72) Inventors: Nan Ei Yu, Gwangju (KR); Kyung Hun Han, Gwangju (KR); Victor Yurlov, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 417 days.

(21) Appl. No.: 16/651,978

(22) PCT Filed: Aug. 22, 2018

(86) PCT No.: PCT/KR2018/009672
§ 371 (c)(1),
(2) Date: Mar. 27, 2020

(87) PCT Pub. No.: WO2019/066259
PCT Pub. Date: Apr. 4, 2019

(65) Prior Publication Data
US 2020/0259256 A1    Aug. 13, 2020

(30) Foreign Application Priority Data
Sep. 28, 2017   (KR) .................. 10-2017-0125836

(51) Int. Cl.
*H01Q 3/26*    (2006.01)
*G01S 17/26*    (2020.01)
(Continued)

(52) U.S. Cl.
CPC .......... *H01Q 3/2676* (2013.01); *G01S 7/4811* (2013.01); *G01S 17/26* (2020.01); *G01S 17/32* (2013.01); *G02F 1/292* (2013.01)

(58) Field of Classification Search
CPC ..... G01S 7/4814; G01S 7/4815; G01S 7/4817
See application file for complete search history.

(56) References Cited

U.S. PATENT DOCUMENTS 5,543,805 A * 8/1996 Thaniyavarn ........ H01Q 3/2676
                                                342/368
5,966,476 A * 10/1999 Hwang ................. G02F 1/2955
                                                385/16
(Continued)

FOREIGN PATENT DOCUMENTS

CN         105206938 A    12/2015
JP           2500106 B2     5/1996
(Continued)

OTHER PUBLICATIONS

Poulton et al. "Large-scale silicon nitride nanophotonic phased arrays at infrared and visible wavelengths", Optics Letters vol. 42, Issue 1, pp. 21-24, (published Jan. 1, 2017) (Year: 2017).*
(Continued)

*Primary Examiner* — Eric L Bolda

(57) ABSTRACT

The present invention relates to a light phased array antenna and a Light Detection and Ranging (LiDAR) including the same. The present invention provides a light phased array antenna including: a light distributing unit configured to receive light from a laser generator and distribute the received light to a plurality of antenna element waveguides; a phase modulating unit configured to modulate a phase of light propagated through the antenna element waveguides by applying an electric field to the plurality of antenna element waveguides; and a light output unit configured to output light modulated in the phase modulating unit, in which the light distributing unit, the phase modulating unit, and the light output unit include a base part and an optical wave-
(Continued)

guide provided on the base part and including the plurality of antenna element waveguides, and a LiDAR including the same.

17 Claims, 7 Drawing Sheets

(51) Int. Cl.
*G01S 7/481* (2006.01)
*G01S 17/32* (2020.01)
*G02F 1/29* (2006.01)

(56) References Cited

U.S. PATENT DOCUMENTS

| | | | |
|---|---|---|---|
| 6,856,737 B1* | 2/2005 | Parker | G02F 1/353 359/344 |
| 2010/0187442 A1 | 7/2010 | Hochberg et al. | |
| 2015/0346340 A1* | 12/2015 | Yaacobi | G01S 7/499 356/5.11 |
| 2016/0357086 A1 | 12/2016 | Jewart et al. | |
| 2017/0371227 A1* | 12/2017 | Skirlo | G02F 1/2955 |
| 2018/0039154 A1* | 2/2018 | Hashemi | G02F 1/2955 |
| 2018/0052378 A1* | 2/2018 | Shin | G02F 1/292 |
| 2018/0107091 A1* | 4/2018 | Hosseini | G02F 1/292 |
| 2018/0136540 A1* | 5/2018 | Park | G02F 1/2955 |

FOREIGN PATENT DOCUMENTS

| | | |
|---|---|---|
| KR | 100161897 B1 | 12/1998 |
| KR | 101720434 B1 | 3/2017 |
| KR | 20170057802 A | 5/2017 |
| KR | 20170058219 A | 5/2017 |
| WO | WO2015200800 A1 | 12/2015 |

OTHER PUBLICATIONS

Yang, Dengcai et al. "Laser-phased-array beam steering controlled by lithium niobate waveguides", Optical Engineering, Jun. 2014.
Extended European Search Report for EP 18863478.6, dated May 21, 2021.

* cited by examiner

OPTICAL PHASED ARRAY ANTENNA AND LIDAR INCLUDING SAME

TECHNICAL FIELD

The present invention relates to a light phased array antenna and a Light Detection and Ranging (LiDAR) including the same. More particularly, the present invention relates to a light phased array antenna using an optical waveguide, and a Light Detection and Ranging (LiDAR) including the same.

BACKGROUND ART

Light Detection and Ranging (LiDAR) is a technology that uses lasers to measure a distance, and has been widely used in construction or military technologies for the purpose of constructing terrain data for establishing geographic information. Recently, with the application of the LiDAR technology to autonomous vehicles and mobile robots, interest in LiDAR is increasing.

A LiDAR system includes a laser transceiving module and a signal processing module. The LiDAR may be divided into a Time of Flight (ToF) method and a Phase Shift (PS) method according to a modulation method of a laser signal. In addition, the LiDAR may also be divided into a flash method of simultaneously scanning a laser beam to a large area and a scanning method of point mapping a 3D space through a rotation of a laser beam in the vertical and horizontal directions according to a laser emission method.

The LiDAR of the scanning method includes an optical structure rotated by a motor in order to change a radiation angle of a laser beam in the related art. The LiDAR in the mechanical driving method has a problem in weight of a motor and power consumption.

In the meantime, a light phased array antenna distributes an incident laser to each antenna element through several directional couplers, modulates a phase of the distributed laser, and adjusts a travelling direction of the output laser.

For example, U.S. Pat. No. 9,753,351 (Title of the invention: PLANAR BEAM FORMING AND STEERING OPTICAL PHASED ARRAY CHIP AND METHOD OF USING SAME) discloses a beam foaming and steering optical phased array chip including a laser, a splitting section including a Y-branch tree and multi-mode interference couplers, an optical phase shifter, and an out-of-plane optical coupler. The related art presents the implementation of the optical phase shifter by using two grouped linear ohmic heating electrodes.

However, under a condition requiring a stable operation regardless of a temperature change, such as an autonomous vehicle, the technology of changing a phase by local heating using the heating electrode as in the related art may not be appropriate.

DISCLOSURE

Technical Problem

The present invention is conceived to solve the problem of the Light Detection and Ranging (LiDAR) in the related art, and an object of the present invention is to provide a light phased array antenna, which does not include a mechanical driving means, performs a stable operation regardless of a temperature change, is easily manufactured, and has an improved operation characteristic, and a LiDAR including the same.

Technical Solution

The present invention provides a light phased array antenna, including: a light distributing unit configured to receive light from a laser generator and distribute the received light to a plurality of antenna element waveguides; a phase modulating unit configured to modulate a phase of light propagated through the antenna element waveguides by applying an electric field to the plurality of antenna element waveguides; and a light output unit configured to output light modulated in the phase modulating unit, in which the light distributing unit, the phase modulating unit, and the light output unit include a base part and an optical waveguide provided on the base part and including the plurality of antenna element waveguides.

In the exemplary embodiment, the light distributing unit may include a light input unit to which the light from the laser generator is input, and a light splitting unit which splits the light input to the light input unit to a plurality of light.

Further, the light input unit may have an inverse tapered shape having a narrow portion, to which light is input, and a width increasing in a direction of the phase modulating unit.

Further, the phase modulating unit may include a first electrode and a second electrode provided at both sides of the antenna element waveguide so as to form an electric field in the antenna element waveguide.

Further, the base part may include a first layer and a second layer formed on an upper surface of the first layer, and the optical waveguide may be provided on an upper surface of the second layer.

The second layer may be formed of a non-linear optical material layer, and the non-linear material layer may include at least one of lithium niobate, lithium tantalite, lithium triborate, beta-barium borate, and potassium titanyl phosphate.

In the meantime, the antenna element waveguide may include a main waveguide layer and an auxiliary waveguide layer provided on the main waveguide layer. The main waveguide layer may be formed of a silicon nitride, and the auxiliary waveguide layer may be formed of silicon.

In the exemplary embodiment, the light output unit may be formed by changing a height of the antenna element waveguide. Particularly, the light output unit may be formed by spacing a plurality of diffractive gratings having a higher height of the antenna element waveguide.

In the exemplary embodiment, the light output unit may be formed by changing a width of the antenna element waveguide. Particularly, the light output unit may be formed by providing a plurality of lateral protrusions at both sides of the antenna element waveguide.

In the exemplary embodiment, the light output unit may be formed with a plurality of spaced stepping-stone parts obtained by cutting the antenna element waveguide.

Further, the present invention provides a Light Detection and Ranging (LiDAR), including: a laser generator; the light phased array antenna; a light receiving unit configured to receive light reflected from an object after the light is emitted from the light phased array antenna; and a signal processing unit configured to process a signal received by the light receiving unit.

Advantageous Effects

According to the present invention, there is an advantage in that it is possible to control an incident laser to be easily output in a desired direction without a mechanical driving device.

Further, according to the present invention, there is an advantage in that it is possible to output a laser beam by minimizing an influence by an external environment change by adjusting a phase of light by an intensity of an electric field without using a local heating method.

Further, according to the present invention, there is an advantage in that it is possible to easily manufacture an existing light phased array panel, decrease weight, and improve mass-production capacity.

BEST MODE

Figure 1:
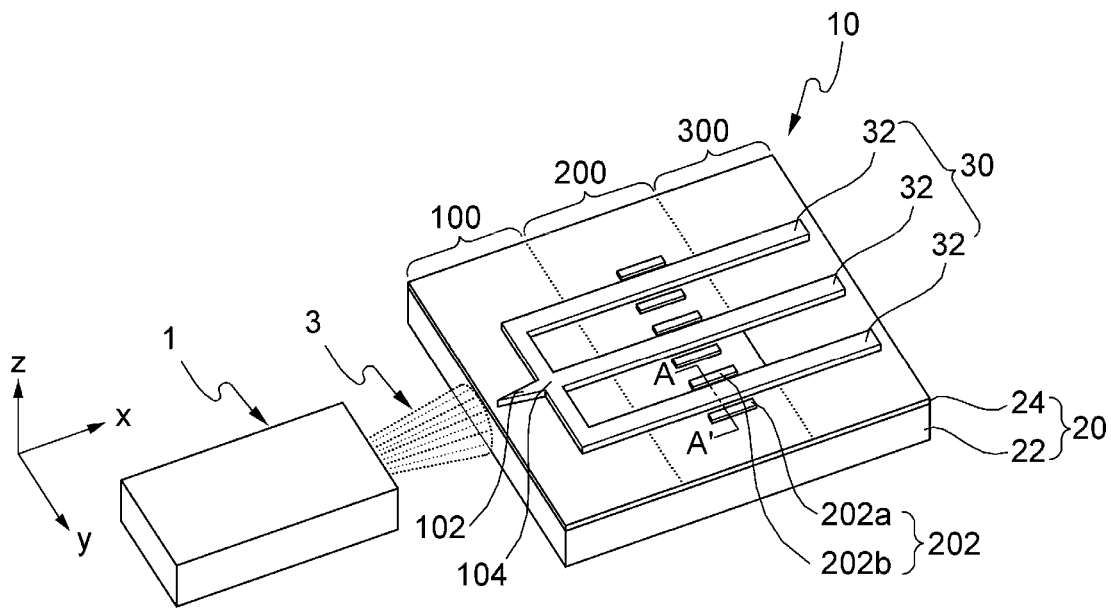
FIG. 1 is a diagram illustrating a schematic configuration of a light phased array antenna according to an exemplary embodiment of the present invention.

Hereinafter, an exemplary embodiment of the present invention will be described in detail with reference to the accompanying drawings. First of all, it should be noted that in giving reference numerals to elements of each drawing, like reference numerals refer to like elements even though the like elements are shown in different drawings. In the following description of the present invention, a detailed description of known configurations or functions incorporated herein will be omitted when it is judged that the detailed description may make the subject matter of the present invention unclear. It should be understood that although the exemplary embodiment of the present invention are described hereafter, the technical spirit of the present invention is not limited thereto and may be changed and modified in various ways by those skilled in the art.

Figure 2:
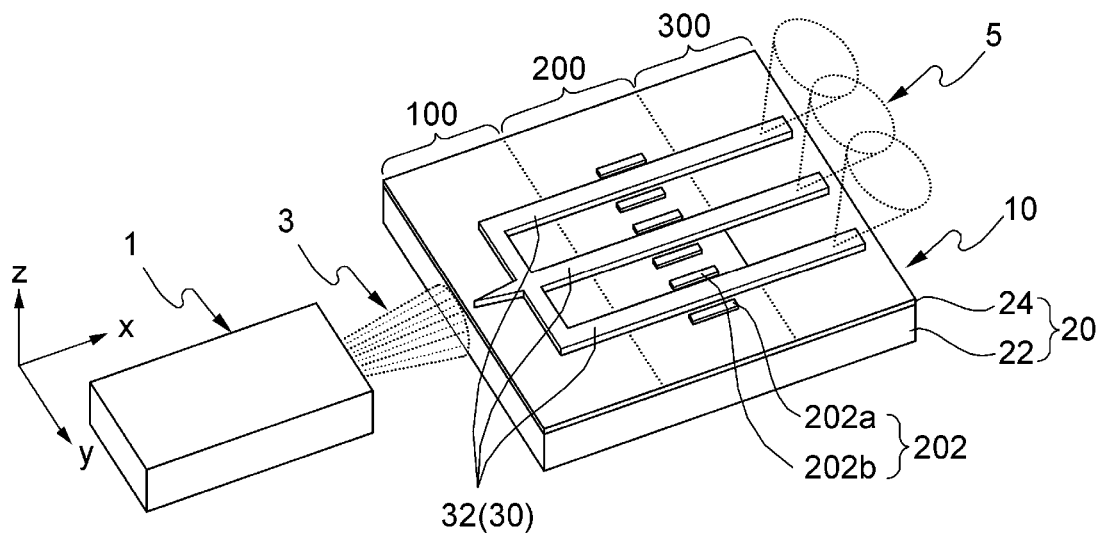
FIG. 2 is a diagram illustrating a state where a laser beam is output from a light output unit of the light phased array antenna according to the exemplary embodiment of the present invention.

FIG. 1 is a diagram illustrating a schematic configuration of a light phased array antenna according to an exemplary embodiment of the present invention, and FIG. 2 is a diagram illustrating a state where a laser beam is output from a light output unit of the light phased array antenna according to the exemplary embodiment of the present invention.

A light phased array antenna 10 according to an exemplary embodiment of the present invention includes a light distributing unit 100, a phase modulating unit 200, and a light output unit 300. A laser transmitting module of a Light Detection and Ranging (LiDAR) may be configured including the light phased array antenna 10 and a laser generator 1 supplying a laser beam to the light distributing unit 100 of the light phased array antenna 10. In the meantime, the LiDAR according to the present invention may further include a laser receiving module which receives reflected light after the light emitted from the laser transmitting module to the outside is reflected on an object.

The laser generator 1 may change a wavelength of the generated laser, and for example, the laser generator 1 may be a tunable laser diode. The laser beam output from the light phased array antenna 10 to the outside may be rotated in one direction according to a change in the wavelength of the laser beam supplied to the light phased array antenna 10. Referring to FIG. 1, according to the change in the wavelength of the laser beam supplied from the laser generator 1, a direction of the laser beam output from the light output unit 300 may be rotated based on a Y-axis.

The light phased array antenna 10 according to the present invention includes a base part 20, and an optical waveguide 30 provided on one surface of the base part 20. By the functions or structures of the base part 20 and the optical waveguide 30 or an additional configuration, the light distributing unit 100, the phase modulating unit 200, and the light output unit 300 configuring the light phased array antenna 10 may be divided. The base part 20 may include a first layer 22 and a second layer 24 formed on an upper surface of the first layer 22. Further, the optical waveguide 30 may be provided on an upper surface of the second layer 24. In the exemplary embodiment, the first layer 22 may be a substrate made of a silicon material, and the second layer 24 may be a non-linear optical material layer.

In the exemplary embodiment of the present invention, the first layer 22 may be provided as a substrate provided throughout the entirety of the light distributing unit 100, the phase modulating unit 200, and the light output unit 300. However, the second layer 24 may be provided only at least a part of the phase modulating unit 200. However, for easiness of manufacturing, the light phased array antenna 10 may be manufactured by a method of forming the second layer 24 on the entire upper surface of the first layer 22 and then forming the optical waveguide 30 in the second layer 24.

The light distributing unit 100 receives a laser beam 3 generated in the laser generator 1 and distributes the received laser beam 3 to a plurality of antenna element waveguides 32 (in FIG. 1, for illustration, three antenna element waveguides 32 are illustrated, but in carrying out the present invention, the number of antenna element waveguides 32 may be more than 3). The light distributing unit 100 includes a light input unit 102 to which light is input from the laser generator 1, and a light splitting unit 104 which distributes the light received by the light input unit 102 into the plurality of light. In the exemplary embodiment, the light input unit 102 and the light splitting unit 104 may be implemented as a part of the optical waveguide 30.

In the case where the laser generator 1 is formed of a laser diode, since a mode diameter of the laser beam 3 output from the laser diode is larger than a mode diameter of the waveguide 30 of the phased array antenna, the light input unit 102 may have an inverse tapered form (a narrow width of a portion to which the laser beam is input and a larger width in a direction of the phase modulating unit 200) to decrease the mode diameter.

The light splitting unit 104 splits the light input to the light input unit 102 and transfers the split light to the plurality of antenna element waveguides 32. The light splitting unit 104 may be formed of a plurality of couplers. As the coupler forming the light splitting unit 104, a multi-mode interference coupler, a Y-junction coupler, or a directional coupler may be used.

The phase modulating unit 200 modulates a phase of light distributed by the light distributing unit 100 to each antenna element waveguide 32. The phase modulating unit 200 includes an electrode unit 202 including a first electrode 202a and a second electrode 202b disposed at both sides of the antenna element waveguide 32. The phase modulating unit 200 modulates the phase of the light transmitted through the antenna element waveguide 32 by forming an electric field by applying electric potential to the first electrode 202a and the second electrode 202b. According to the modulation of the phase by the light by the phase modulating unit 200, a direction of the laser beam output from the light output unit 300 may be rotated based on an X-axis in FIG. 1.

The light output unit 300 outputs the laser beam to an upper portion of the base part 20 while maintaining the phase distribution modulated in the phase modulating unit 200. Referring to FIG. 2, the light output unit 300 outputs the laser beam in a Z-axis direction in an X-Y plane, and a wavelength of the laser beam input to the light distributing unit 100 and an output direction of the laser beam 5 output from the light output unit 300 according to the phase modulated by the phase modulating unit 200 are steered.

In the meantime, in addition to the configuration of the light phased array antenna 10 illustrated in FIG. 1, the light phased array antenna 10 may additionally include a cover member (not illustrated) which is coupled to face the base part 20 and covers an upper portion of the optical waveguide 30 to protect the optical waveguide, and is formed of a silicon oxide ($SiO_2$) and the like.

Figure 3:
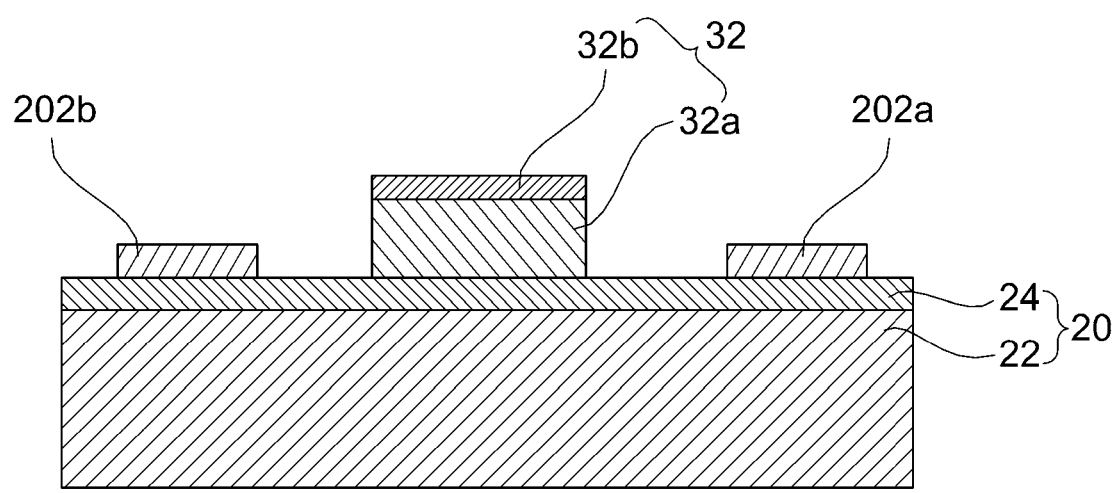
FIG. 3 is a diagram (a cross-section in direction A-A' of FIG. 1) illustrating a configuration of a phase modulating unit of the light phased array antenna according to the exemplary embodiment of the present invention.

FIG. 3 is a diagram (a cross-section in direction A-A' of FIG. 1) illustrating a configuration of the phase modulating unit of the light phased array antenna according to the exemplary embodiment of the present invention.

In describing the configuration of the phase modulating unit 200, the antenna element waveguides 32 are formed on the upper surfaces of the first layer 22 and the second layer 24 configuring the base part 20, and the first electrode 202a and the second electrode 202b are provided at both sides of the antenna element waveguide 32.

The first layer 22 may be made of a silicon material, and in the exemplary embodiment, the first layer 22 may be made of a silicon oxide ($SiO_2$).

The second layer 24 may be provided in the form of a thin film provided on the upper surface of the first layer 22. In the exemplary embodiment, the second layer 24 may be formed as a non-linear optical material layer. The second layer 24 may be made of a material including lithium (Li), barium (Ba), or potassium (K). Particularly, the second layer 24 may be a thin film formed of lithium niobate ($LiNbO_3$). As another embodiment, the second layer 24 may be a thin film formed of at least one of lithium tantalate ($LiTaO_3$), lithium triborate ($LiB_3O_5$), beta-barium borate ($\beta$-$BaB_2O_4$), potassium titanyl phosphate ($KTiOPO_4$ or KTP).

The antenna element waveguide 32 formed on the upper surface of the second layer 24 may include a main waveguide layer 32a and an auxiliary waveguide layer 32b formed on an upper surface of the main waveguide layer 32a. Most of the light transmitted from the light distributing unit 100 is transmitted through the main waveguide layer 32a.

In the exemplary embodiment, the main waveguide layer 32a may be formed of a silicon nitride ($Si_3N_4$). Since the silicon nitride has low propagation loss, the silicon nitride may include power of most of the waveguide modes. However, in carrying out the present invention, it is a matter of course that the main waveguide layer 32a may be formed by using the equivalent material, in addition to the silicon nitride. The auxiliary waveguide layer 32b may be formed of silicon (Si). The auxiliary waveguide layer 32b, which is formed on the main waveguide layer 32a and is made of a silicon material, has a high refractive index to serve to increase an effective refractive index value of the antenna element waveguide 32 and decrease a mode size of the antenna element waveguide 32.

According to the present invention, when the auxiliary waveguide layer 32b is provided, it is possible to reduce cross-talk between the adjacent antenna element waveguides 32, thereby achieving an advantage in efficiently transmitting light through each antenna element waveguide 32. In the exemplary embodiment, it is possible to increase an effective refractive index of the antenna element waveguide 32 and reduce an intensity of cross-talk between the adjacent antenna element waveguides 32 by forming the main waveguide layer 32a with a silicon nitride and forming the auxiliary waveguide layer 32b with silicon on the main waveguide layer 32a.

In order to increase a maximum measurement distance of the LiDAR, the light phased array antenna may have a higher laser output. However, in the case where the main waveguide layer 32a is formed of silicon, since the main waveguide layer 32a has low laser threshold power and high linear or nonlinear loss, silicon may be disadvantageous. In contrast to this, the case where the main waveguide layer 32a is formed of a silicon nitride, a size of an evanescent wave of the waveguide mode is increased due to a low refractive index, so that there is an advantage in that the maintain waveguide layer 32a may easily interact with an adjacent waveguide having the same propagation constant as that of the main waveguide layer.

In carrying out the present invention, the main waveguide layer 32a formed of the silicon nitride may have a thickness of several hundreds of nanometers (for example, 400 nm) or more so as to include power of most of the waveguide modes, and the auxiliary waveguide layer 32b formed of silicon may have a thickness of several tens to several hundreds of nanometers (for example, 120 nm) or less in order to minimize nonlinear loss by 2-photon absorption.

The first electrode 202a and the second electrode 202b formed on the second layer 24 are formed at both sides of the antenna element waveguide 32 by deposition and the like, and the first electrode 202a and the second electrode 202b may be formed by depositing gold (Au).

The first electrode 202a and the second electrode 202b make an electric field be present in the second layer 24 by applying electric potential. In the case where an electric field is present in the second layer 24 formed of lithium niobate, an effective refractive index of the antenna element waveguide 32 is changed by a Pockels effect that is an electric-optical phenomenon.

The electrode 202 is provided so as to form an electric field in the second layer 24 and/or the antenna element waveguide 32, and the electrode may also be disposed in other ways, in addition to the way in which the electrodes 202 are provided at both sides of the antenna element waveguide 32 as illustrated in FIG. 3.

Figure 4A:
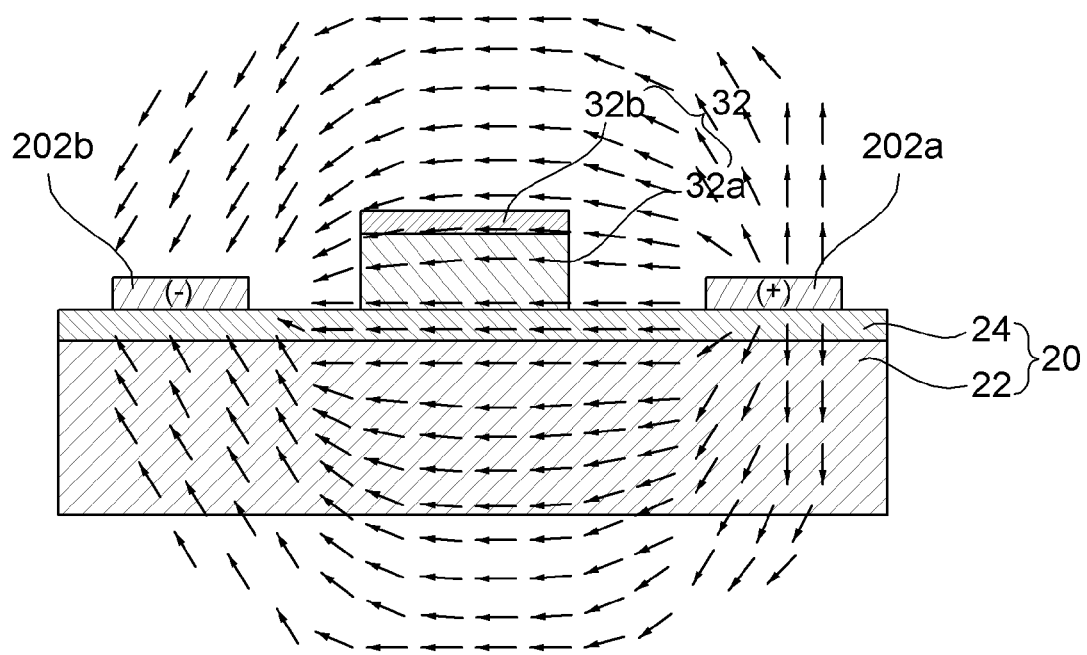
FIG. 4a and FIG. 4b are diagrams illustrating an example of forming an electric field in the phase modulating unit in the light phased array antenna according to the exemplary embodiment of the present invention.
Figure 4B:
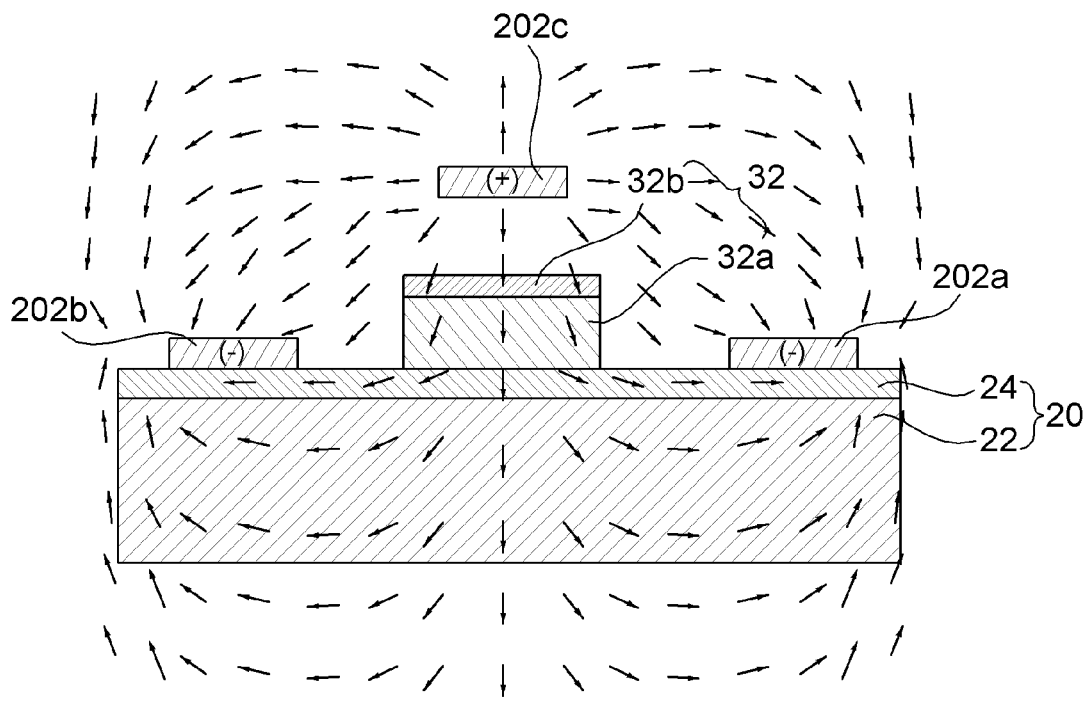

FIG. 4a and FIG. 4b are diagrams illustrating an example of forming an electric field in the phase modulating unit in the light phased array antenna according to the exemplary embodiment of the present invention.

FIG. 4a illustrates an example of forming an electric field by using the first electrode 202a as a positive (+) electrode and the second electrode 202b as a negative (−) electrode.

FIG. 4b illustrates an example of forming an electric field by additionally providing a third electrode 202c in the upper portion of the antenna element waveguide 32 and using the third electrode 202c as a positive (+) electrode and the first electrode 202a and the second electrode 202b as negative (−) electrodes.

It may be preferred to set a thickness of the second layer 24 and a width of the antenna element waveguide 32 so that the Pockels effect is sufficiently exhibited by applying an electric field to the second layer 24 formed of lithium niobate and the like to change the phase of the light transmitting the antenna element waveguide 32 in a wide range.

Next, the light output unit 300 will be described.

The light transmitted through the antenna element waveguide 32 via the phase modulating unit 200 is output from the light output unit 300. In the light output unit 300, the laser beam is emitted to be directed toward the upper portion of the light phased array antenna 10.

In the present invention, the light output unit 300 may be implemented in various methods having a 3D shape. In the case where the light output unit is formed with an optical element in a plane form on a wafer, a laser beam output to an upper portion of the wafer is difficult to have directivity due to vertical refractive index symmetry. That is, the laser beam output in the isotropic direction is reflected from the bottom surface of the optical element and causes an interference phenomenon with a laser travelling to the upper portion of the wafer to change a travelling direction of the output laser beam and generate noise.

In contrast to this, the light output unit 300 presented in the present invention has an advantage in improving directivity of the output laser beam.

In the meantime, in order to increase a limited horizontal viewing angle of the light phased array antenna, a gap between the antenna elements may be close to a distance by a half (λ/2) of the laser beam wavelength, but as the gap between the antenna elements is decreased, a desired output phase distribution of the laser beam may not be obtained by cross-talk between the adjacent antenna elements. In contrast to this, the light output unit 300 presented in the present invention has an advantage in reducing cross-talk.

Figure 5A:
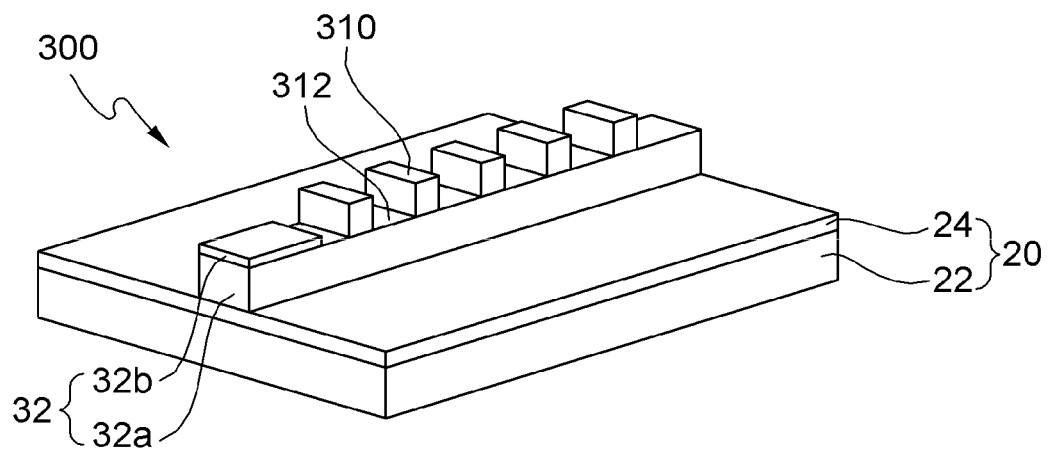
FIG. 5a and FIG. 5b are diagrams illustrating a first embodiment of the light output unit in the light phased array antenna according to the exemplary embodiment of the present invention.
Figure 5B:
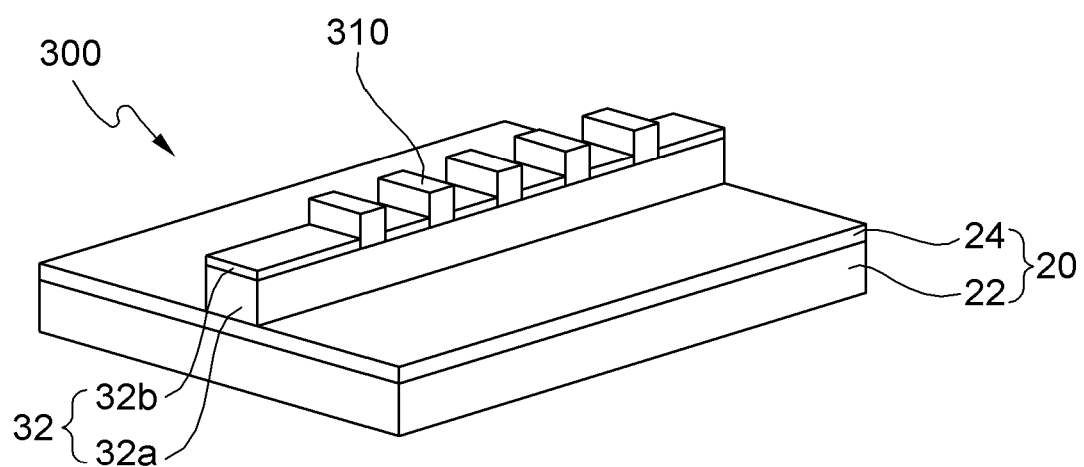
Figure 6A:
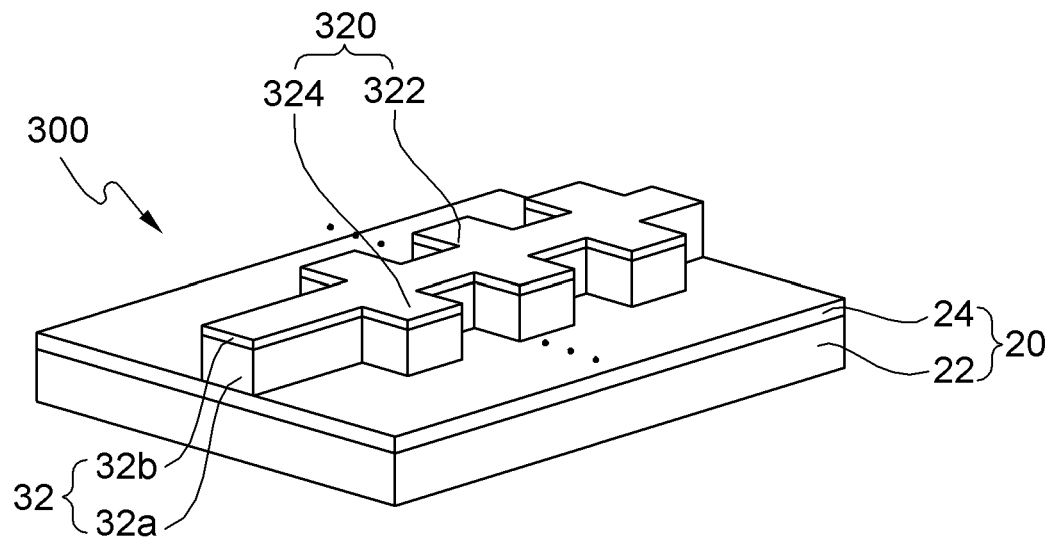
FIG. 6a and FIG. 6b are diagrams illustrating a second embodiment of the light output unit in the light phased array antenna according to the exemplary embodiment of the present invention.
Figure 6B:
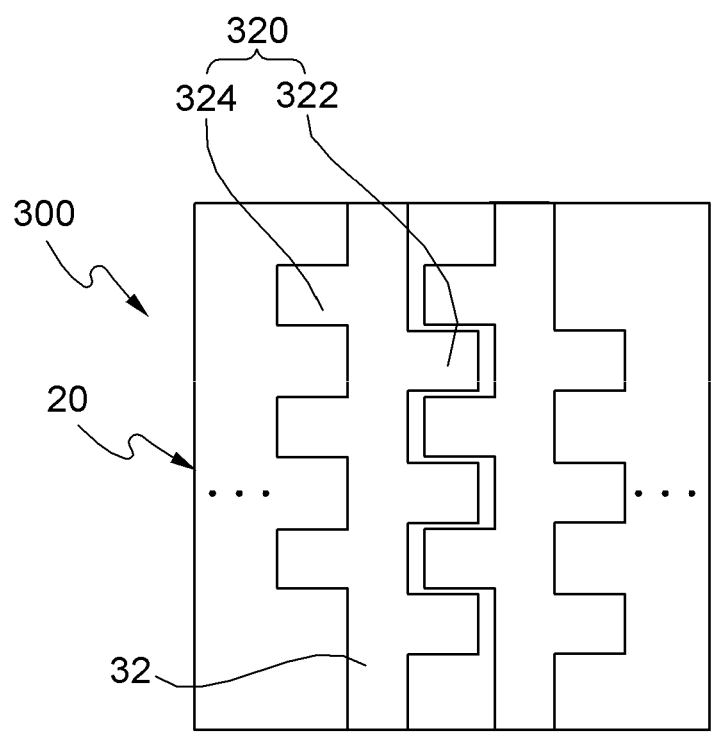
Figure 7A:
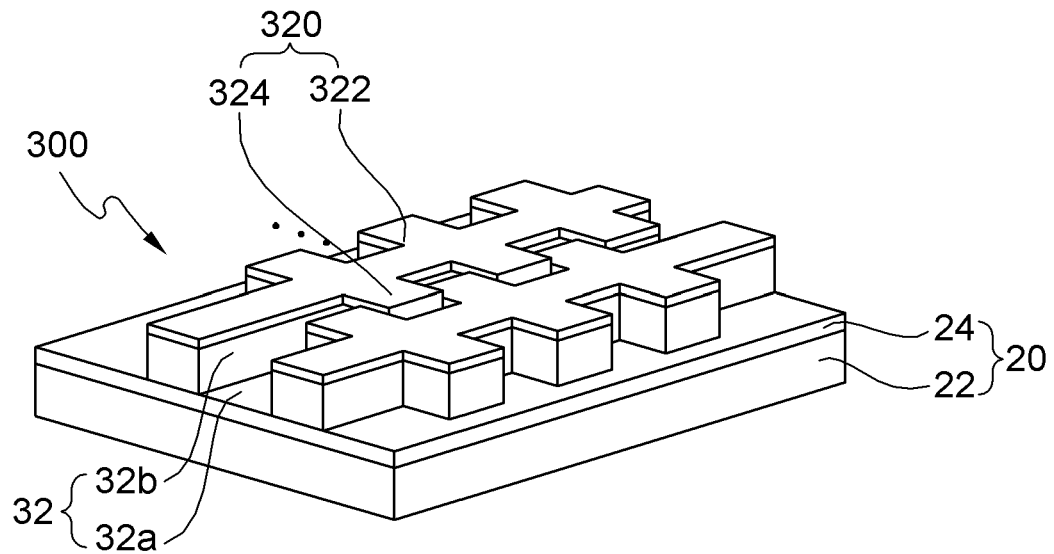
FIG. 7a and FIG. 7b are diagrams illustrating a third embodiment of the light output unit in the light phased array antenna according to the exemplary embodiment of the present invention.
Figure 7B:
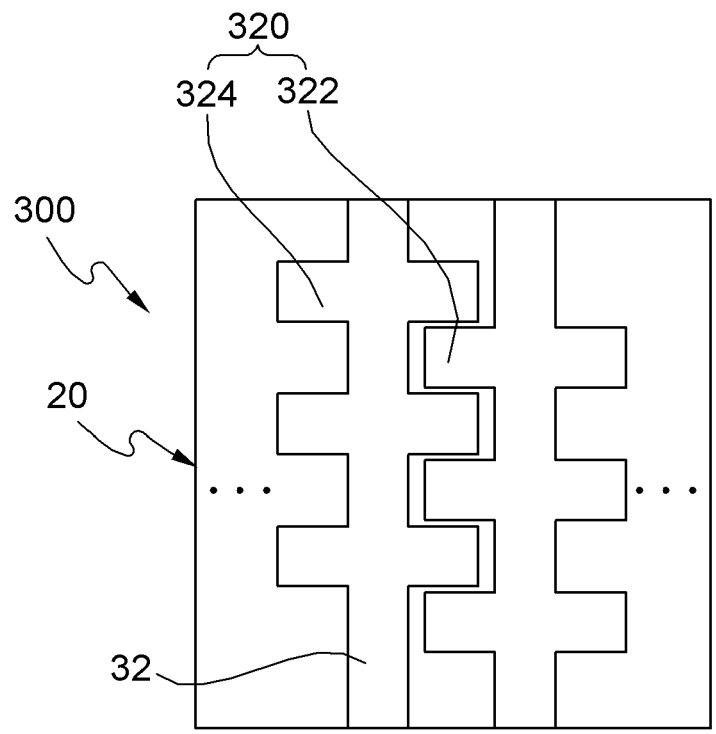
Figure 8:
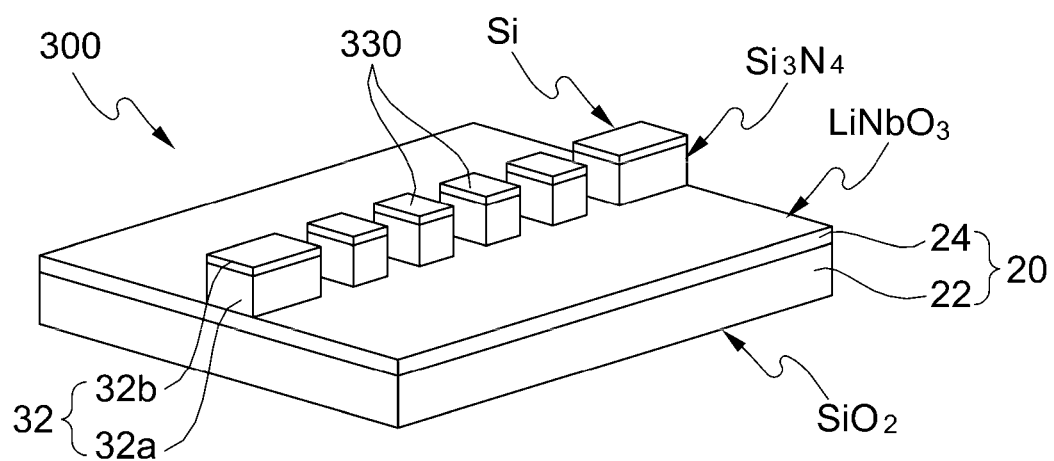
FIG. 8 is a diagram illustrating a fourth embodiment of the light output unit in the light phased array antenna according to the exemplary embodiment of the present invention.

FIG. 5a and FIG. 5b are diagrams illustrating a first embodiment of the light output unit in the light phased array antenna according to the exemplary embodiment of the present invention. FIG. 6a and FIG. 6b are diagrams illustrating a second embodiment of the light output unit in the light phased array antenna according to the exemplary embodiment of the present invention. Further, FIG. 7a and FIG. 7b are diagrams illustrating a third embodiment of the light output unit in the light phased array antenna according to the exemplary embodiment of the present invention, and FIG. 8 is a diagram illustrating a fourth embodiment of the light output unit in the light phased array antenna according to the exemplary embodiment of the present invention.

Referring to FIGS. 5a and 5b, the light output unit 300 includes the base part 20 and the antenna element waveguides 32 formed on the base part 20, and is characterized in forming a diffractive grating 310 by changing a thickness in a height direction of the auxiliary waveguide layer 32b of the antenna element waveguide 32.

Referring to FIG. 5a, all of the auxiliary waveguide layers 32b are removed between the diffractive gratings 310 in the light output unit 300, so that the main waveguide layers 32 are exposed in an upper direction. In contrast to this, referring to FIG. 5b, the diffractive grating 310 protrudes upwardly in the state where the auxiliary waveguide layer 32b covers the upper surface of the main waveguide layer 32a. Several to several hundreds of diffractive grating 310 may be continuously formed.

In the case where the diffractive grating 310 is formed according to a height change of the auxiliary waveguide layer 32b, a phase change of light in a portion in which the diffractive grating 310 is formed and a portion in which the diffractive grating 310 is not formed satisfies constructive interference in the portion in which the diffractive grating 310 is formed and satisfies destructive interference in the portion in which the diffractive grating 310 is not formed, thereby enabling a laser beam to be emitted to be directed to the upper direction.

In the meantime, in order to decrease vertical refractive index symmetry, a maximum value of a thickness of the diffractive grating 310 may be larger than the thickness of the auxiliary waveguide layer 32b in the light distributing unit 100 or the phase modulating unit 200. Further, as described above, the light phased array antenna 10 according to the present invention may be provided with a cover member which covers the optical waveguide 30 on the base part 20 and is formed of a silicon oxide, and the cover member may use a silicon nitride oxide having a larger refractive index than that of a silicon oxide according to a use environment or a characteristic of a LiDAR to which the light phased array antenna 10 is applied.

Referring to FIGS. 6a-6b and 7a-7b, the light output unit 300 includes the base part 20 and the antenna element waveguide 32 formed on the base part 20, and is characterized in that lateral protrusions 320 are formed at left and right sides of the antenna element waveguide 32. The lateral protrusion 320 is formed by increasing a width of the antenna element waveguide 32, and may include first lateral protrusions 322 protruding to the right and second lateral protrusions 324 protruding to the left.

Referring to FIGS. 6a and 6b, the first lateral protrusion 322 and the second lateral protrusion 324 may be alternately formed at the right side and the left side along the antenna element waveguide 32.

Referring to FIGS. 7a and 7b, the first lateral protrusion 322 and the second lateral protrusion 324 may be formed at both sides of the antenna element waveguide 32 while facing each other.

In forming the lateral protrusion 320, as illustrated in FIG. 6b and FIG. 7b, the adjacent lateral protrusions 320 of the antenna element waveguide 32 are disposed in the engaged form, thereby uniformly maintaining a gap between the adjacent antenna element waveguides 32. Further, a propagation constant is different by a difference in a width between the adjacent antenna element waveguides 32, thereby decreasing an intensity of cross-talk by the generated evanescent wave.

Referring to FIG. 8, the light output unit 300 is characterized in including a plurality of stepping-stone parts 300 arranged in a stepping stone form by cutting the antenna element waveguide 32 and spacing the antenna element waveguides 32. As illustrated in FIG. 8, when the light output unit 300 is provided in the form of the stepping-stone part 330, a laser beam output quantity may be advantageously increased in a short distance.

Gaps between the stepping-stone part 330 may be the same or different from each other, or may be non-uniformly set. In the case where the gaps between the stepping-stone part 330 are non-uniform, when an entire average gap is increased, an intensity of cross-talk may be decreased while increasing a horizontal viewing angle.

Figure 9:
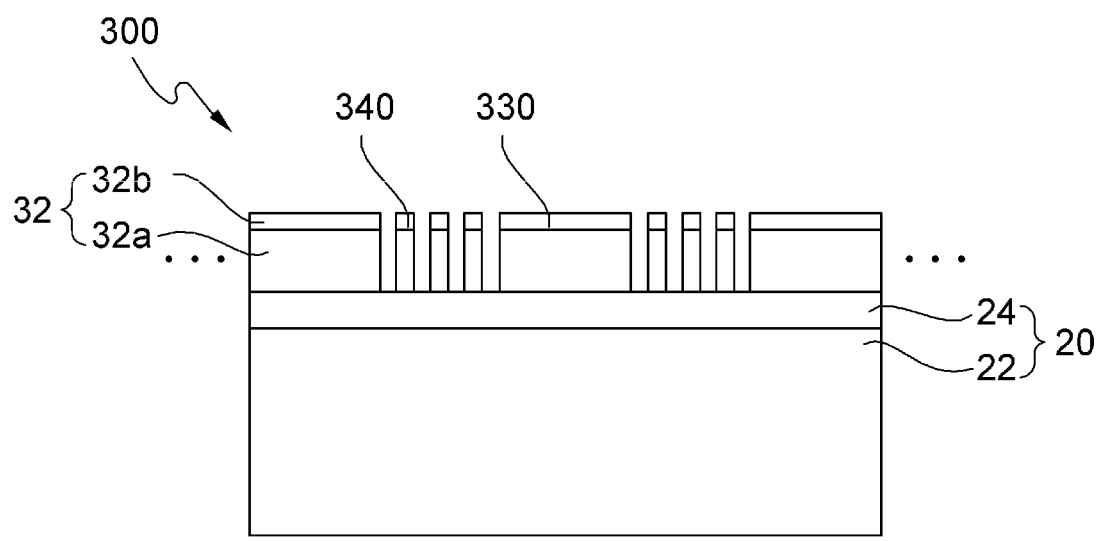
FIG. 9 is a diagram illustrating a fifth embodiment of the light output unit in the light phased array antenna according to the exemplary embodiment of the present invention.

FIG. 9 is a diagram illustrating a fifth embodiment of the light output unit in the light phased array antenna according to the exemplary embodiment of the present invention.

Referring to FIG. 9, in the light output unit 300, the stepping-stone parts 330 arranged in the form of the stepping stone are spaced and disposed like the case of FIG. 8, and the light output unit 300 is characterized in that a plurality of anisotropic metamaterial waveguides 340 in the form of a thin wall is provided between the spaced stepping-stone parts 300. In the embodiment illustrated in FIG. 9, when an intensity of cross-talk between the plurality of stepping-stone parts 330 is large, the intensity of cross-talk may be advantageously adjusted by the anisotropic metamaterial waveguides 340. The stepping-stone part 330 and the anisotropic metamaterial waveguide 340 may be provided in the form in which the auxiliary waveguide layer 32b is formed on the main waveguide layer 32a.

The light phased array antenna 10 according to the present invention may be manufactured by a Complementarily Metal-Oxide Semiconductor (CMOS) process. In the light phased array antenna, a horizontal viewing angle (an angle based on the X-axis of FIG. 1) for detecting a front object may be 120° or more, and a vertical viewing angle (an angle based on the Y-axis of FIG. 1) may be 20° or more.

The LiDAR according to the present invention may include the laser generator 1, the light phased array antenna 10, the light receiving unit which receives a reflected laser beam after the laser beam output from the light phased array antenna is reflected on an object, and the signal processing unit which controls the laser generator 1, the light phased array antenna 10, and the light receiving unit, and processes a signal received from the light receiving unit.

The exemplary embodiment of the present invention has been described for illustrative purposes, those skilled in the art will appreciate that various modifications, additions, and substitutions are possible, without departing from the scope and spirit of the invention. Therefore, the exemplary embodiments disclosed in the present invention and the accompanying drawings are intended to illustrate the technical spirit of the present invention, not to limit the technical spirit of the present invention, and the scope of the present invention is not limited by the exemplary embodiment and the accompanying drawings. The scope of the present invention shall be construed on the basis of the accompanying claims in such a manner that all of the technical ideas included within the scope equivalent to the claims belong to the present invention.

The invention claimed is:

1. A light phased array antenna, comprising:
a light distributing unit configured to receive light from a laser generator and distribute the received light to a plurality of antenna element waveguides;
a phase modulating unit configured to modulate a phase of light propagated through the antenna element waveguides by applying an electric field to the plurality of antennal element waveguides; and
a light output unit configured to output light modulated in the phase modulating unit,
wherein the light distributing unit, the phase modulating unit, and the light output unit include a base part and an optical waveguide provided on the base part and including the plurality of antenna element waveguides,
wherein the base part includes a first layer and a second layer formed on an upper surface of the first layer, and the optical waveguide is provided on an upper surface of the second layer, and
wherein the antenna element waveguide includes a main waveguide layer and an auxiliary waveguide layer provided on the main waveguide layer.

2. The light phased array antenna of claim 1, wherein the light distributing unit includes a light input unit to which the light from the laser generator is input, and a light splitting unit which splits the light input to the light input unit to a plurality of light.

3. The light phased array antenna of claim 2, wherein the light input unit has an inverse tapered shape having a narrow portion, to which light is input, and a width increasing in a direction of the phase modulating unit.

4. The light phased array antenna of claim 1, wherein the phase modulating unit includes a first electrode and a second electrode provided at both sides of the antenna element waveguide so as to form an electric field in the antenna element waveguide.

5. The light phased array antenna of claim 1, wherein the second layer is formed of a non-linear optical material layer.

6. The light phased array antenna of claim 5, wherein the non-linear material layer includes at least one of lithium niobate, lithium tantalite, lithium triborate, beta-barium borate, and potassium titanyl phosphate.

7. The light phased array antenna of claim 1, wherein the main waveguide layer is formed of a silicon nitride, and the auxiliary waveguide layer is formed of silicon.

8. The light phased array antenna of claim 1, wherein the light output unit includes a diffractive grating extending away from the antenna element waveguide in a direction away from the base part.

9. The light phased array antenna of claim 8, wherein the light output unit is formed by spacing a plurality of diffractive gratings having a higher height of the antenna element waveguide.

10. The light phased array antenna of claim 1, wherein the light output unit of the antenna element waveguide includes a plurality of lateral protrusions.

11. The light phased array antenna of claim 10, wherein the plurality of lateral protrusions extend from both sides of the antenna element waveguide.

12. The light phased array antenna of claim 1, wherein the light output unit is formed with a plurality of spaced stepping-stone parts obtained by cutting the antenna element waveguide.

13. A Light Detection and Ranging (LiDAR), comprising:
a laser generator;
a light phased array antenna;
a light receiving unit configured to receive light reflected from an object after the light is emitted from the light phased array antenna; and
a signal processing unit configured to process a signal received by the light receiving unit.,
wherein the light phased array antenna comprises,
a light distributing unit configured to receive light from the laser generator and distribute the received light to a plurality of antenna element waveguides;
a phase modulating unit configured to modulate a phase of light propagated through the antenna element waveguides by applying an electric field to the plurality of antennal element waveguides; and a light output unit configured to output light modulated in the phase modulating unit, wherein the light distributing unit, the phase modulating unit, and the light output unit include a base part and an optical waveguide provided on the base part and including the plurality of antenna element waveguides, wherein the base part includes a first layer and a second layer formed on an upper surface of the first layer, and the optical waveguide is provided on an upper surface of the second layer, and wherein the antenna element waveguide includes a main waveguide layer and an auxiliary waveguide layer provided on the main waveguide layer.

14. The LiDAR of claim 13, wherein the light distributing unit includes a light input unit to which the light from the laser generator is input, and a light splitting unit which splits the light input to the light input unit to a plurality of light.

15. The LiDAR of claim 13, wherein the light output unit includes a diffractive grating extending away from the antenna element waveguide in a direction away from the base part.

16. The LiDAR of claim 13, wherein the light output unit of the antenna element waveguide includes a plurality of lateral protrusions.

17. The LiDAR of claim 13, wherein the light output unit is formed with a plurality of spaced stepping-stone parts obtained by cutting the antenna element waveguide.

* * * * *